United States Patent [19]

Aiyama et al.

[11] 4,299,605
[45] Nov. 10, 1981

[54] COLLECTING FILTER BAG

[75] Inventors: Fumihiko Aiyama, Musashino; Kenzo Hiramatsu, Hoya, both of Japan

[73] Assignee: Kioritz Corporation, Japan

[21] Appl. No.: 172,572

[22] Filed: Jul. 28, 1980

[30] Foreign Application Priority Data

May 19, 1980 [JP] Japan ............................ 55-67589[U]

[51] Int. Cl.³ ............................................ B01D 46/02
[52] U.S. Cl. ............................................ 55/370; 150/7
[58] Field of Search ...................... 229/62, 65; 150/19, 150/25, 7, 3; 55/369-370, 371

[56] References Cited

U.S. PATENT DOCUMENTS

| | | | |
|---|---|---|---|
| 1,125,006 | 1/1915 | Clarke | 150/22 |
| 1,513,395 | 10/1924 | Holmes | 55/370 |
| 2,093,345 | 9/1937 | Weslowski | 150/3 |
| 2,448,376 | 8/1948 | LeFevre | 150/7 |
| 3,191,365 | 6/1965 | Feeley | 229/62 |
| 3,943,988 | 3/1976 | Consorti | 150/7 |
| 4,156,339 | 5/1979 | Dunn et al. | 150/7 |

FOREIGN PATENT DOCUMENTS 904937 2/1954 Fed. Rep. of Germany ........ 55/369

Primary Examiner—Bernard Nozick
Attorney, Agent, or Firm—Karl W. Flocks

[57] ABSTRACT

A collecting bag for collecting dusts having an air permeable bag body made of a cloth and provided at its one end with a connection opening for connection to a passage of the dust laden air and at its other end with a discharge opening through which the dust content of the bag is taken out. A pair of opposing plate members are jointed to the opposing peripheral edges of the discharge opening of the bag body so as to cooperate with each other in opening and closing the discharge opening. One of the plate members may be provided with a hook which engages a suitable member fixed to the bag in the closed state of the discharge opening.

1 Claim, 3 Drawing Figures

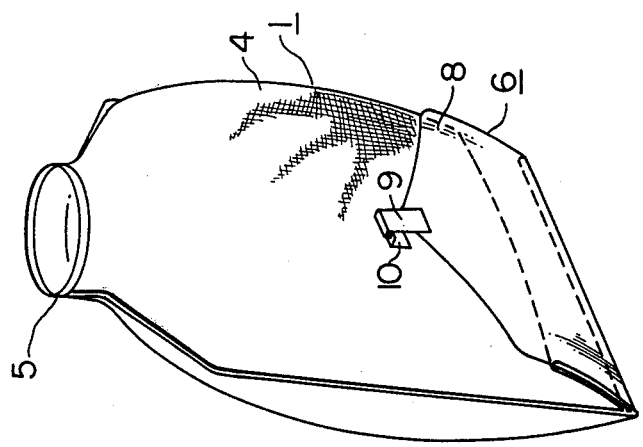
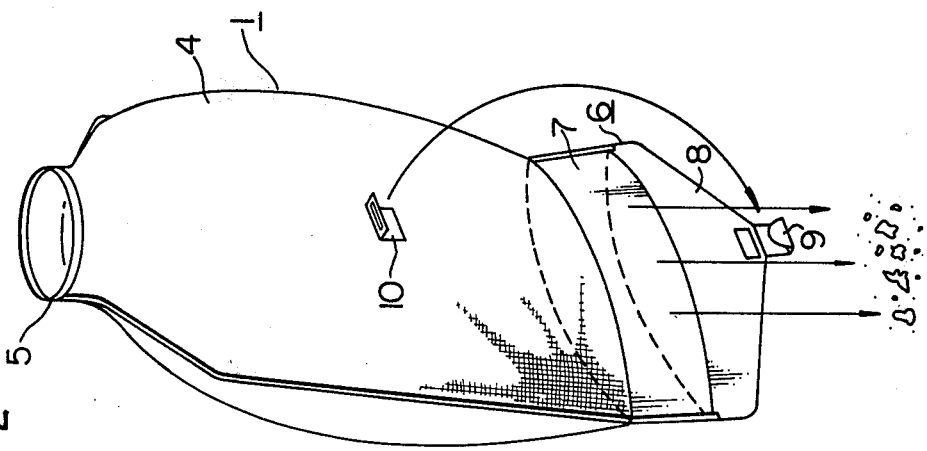

COLLECTING FILTER BAG

BACKGROUND OF THE INVENTION

The present invention relates to a collecting bag and, more particularly, to a collecting bag having a specific construction for opening and closing the bag.

In generally, collecting bags are provided at their openings with fastener or buttons so that they may be opened and closed as desired. However, it is often experienced that the opening and closing operation is hindered by the content of the bag jamming into the connecting portion, particularly when the bag is used as a dust collecting bag.

A collecting bag which is designed to be detached from a collecting pipe or the like to permit the withdrawal of the content has also been proposed. This type of collecting bag, however, is not simple nor reliable.

SUMMARY OF THE INVENTION

Under these circumstances, the present invention aims at providing an improved collecting bag having higher simplicity and reliability while preserving the collecting function of conventional air permeable collecting bag.

To this end, according to the invention, there is provided a collecting bag having a pair of mutually opposing plate materials provided at the periphery of opening thereof.

By the combination of the cloth material of the bag and the plate members, it is possible to open and close the opening of the bag easily and reliably. Namely, in the closed state of the bag, opposing edges of opening of the bag are closely contacted by each other without any gap, thanks to the cooperation of the plate members.

The above and other objects, as well as advantageous features of the invention will become clear from the following description of the preferred embodiments taken in conjunction with the accompanying drawings.

BRIEF DESCRIPTION OF THE DRAWINGS

FIG. 2 is a perspective view of the bag with its opening opened; and

FIG. 3 is a perspective view of the bag with its opening closed.

DESCRIPTION OF THE PREFERRED EMBODIMENTS

Figure 1:
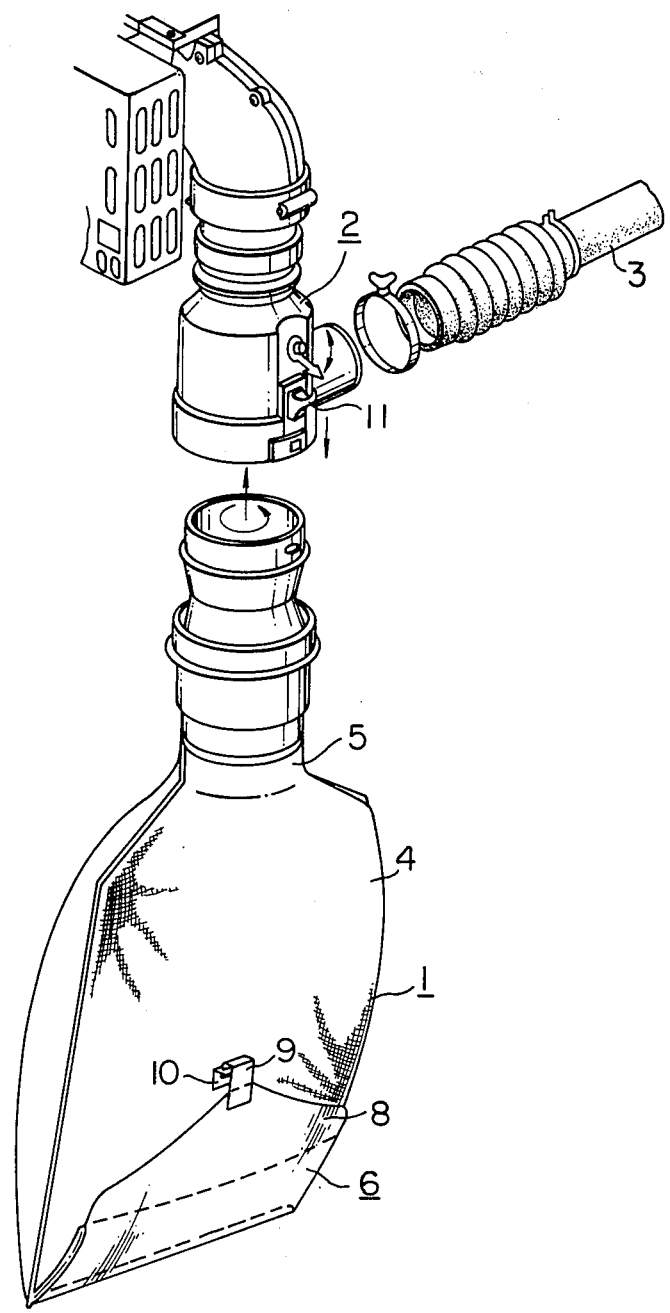
FIG. 1 is a perspective view of a collecting bag in accordance with an embodiment of the invention, showing how the bag is attached.

The invention will be described hereinunder through a specific embodiment, but not exclusively, used as a dust collecting bag of a vacuum cleaner.

Referring to the drawings, a collecting bag 1 of the invention is attached to an air pipe 2 of a vacuum cleaner by means of a fixing member 11. Although not shown, the vacuum cleaner has a blower which discharges air into the air pipe 2. The air pipe 2 is provided at its intermediate portion with a venturi portion (not shown) having a throat of reduced cross-sectional area. A collecting pipe 3 is connected to the throat of the venturi portion. As the air flows at a high velocity through the throat, the static pressure is reduced in accordance with the law of venturi, so that a negative pressure lower than the atmospheric pressure is generated in the collecting pipe 3 and a sucking force for attracting and sucking the dusts or the like is transmitted through the air. The dusts or the like is thus collected by the collecting pipe 3 and is transferred through the venturi portion to the collecting bag 1 so as to be collected in the latter.

The collecting bag 1 is made of an air permeable cloth 4, so that the air passes freely through the wall of the bag 1 leaving only the suspended matters in the collecting bag 1. As will be seen from FIGS. 2 and 3, the collecting bag 1 is provided at its upper end with a connection opening 5 and, at the lower end, with a large opening member generally designated at a numeral 6. The opening member 6 includes a pair of flexible plate members 7, 8 which are jointed to the peripheral edges of discharge opening of the bag 1 unitarily with the latter. Due to the flexible nature of these plate members 7, 8, it is possible to form a large opening of a diameter substantially equal to that of the bag 1, as will be seen from FIG. 2. One 7 of these plate members has a band-like form while the other 8 has a tongue-like form provided at its lower end with a hook member 9 adapted to engage a member 10 provided on the cloth 4.

FIG. 3 shows the collecting bag 1 in the closed state, in which the member 10 is engaged by the hook 9. For taking out the content, the opening member 6 is opened as shown in FIG. 2 to permit the content to drop by itself.

What is claimed is:

1. A dust collecting bag for a vacuum cleaner or the like comprising an air permeable cloth bag having an assembly end with an inlet opening adapted to be assembled onto a vacuum cleaner for reception of dust, dirt, and the like and a second end with a discharge opening extending oppositely from said inlet opening, said bag having opposing peripheral edges adjacent said discharge opening with a pair of opposing plate members extending unitarily with said bag is jointed relationship with said opposing peripheral edges thereby affording ease of folding and unfolding said opposing plate members for closing and opening said discharge opening, said opposing plate members being foldable into close contact with each other to prevent leakage from said bag through said discharge opening and further functioning as a reinforcement around said discharge opening, wherein one of said plate members has a band-like form, the other of said plate members has a tongue-like form and a hook element at its lower end, said bag has an apertured member attached thereto with said apertured member being adapted to receive said hook element in cooperative relationship to retain said plate members in closed condition with respect to said discharge opening.

* * * * *